Patented May 4, 1926.

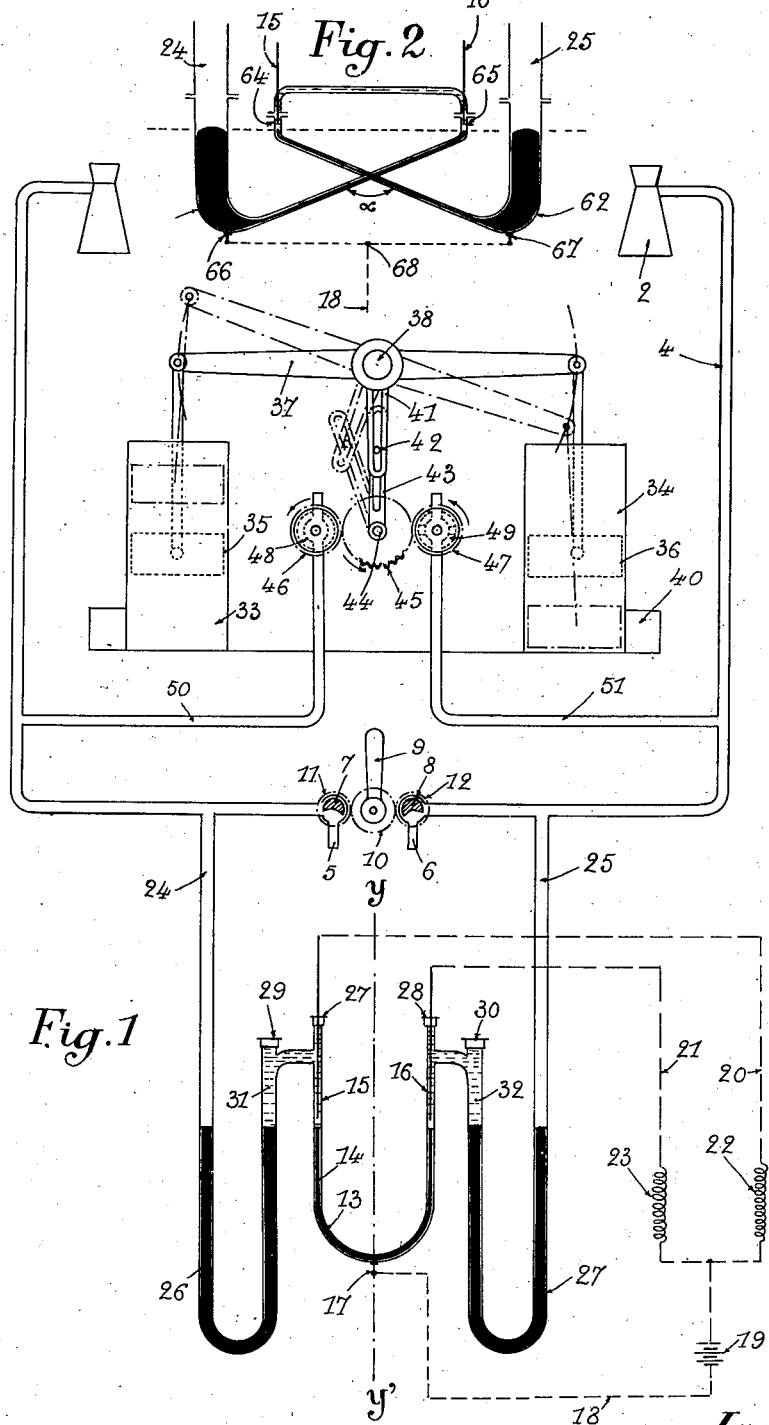

1,583,359

UNITED STATES PATENT OFFICE.

MAURICE ALEXANDRE MAZADE, OF PARIS, FRANCE.

STABILIZER FOR THE STRAIGHT TRAVEL OF AIRCRAFT.

Application filed December 23, 1924. Serial No. 757,705.

*To all whom it may concern:*

Be it known that I, MAURICE ALEXANDRE MAZADE, citizen of the French Republic, residing at Paris, in the French Republic, have invented new and useful Improvements in Stabilizers for the Straight Travel of Aircraft, of which the following is a specification.

The present invention relates to an automatic device or stabilizer providing for the straight travel of aircraft, and chiefly of aeroplanes.

One feature of the invention resides in that the stabilizer comprises Venturi nozzles, or the like, disposed on either side of the longitudinal middle plane of the aircraft and preferably in the same transverse plane of the aircraft, manometric means connected to said nozzles and adapted to register the pressure differential produced by the same and a servo-motor controlled by said manometric means and adapted to operate the rudder of the aircraft.

A further feature of the invention consists in that adjustable air inlet members are provided upon the pipes connecting the Venturi nozzles, or the like, to the corresponding elements of the manometric means, and means being also provided for operatively connecting said air inlet members to the servo-motor and whereby the action of the nozzle having the predominant action upon the manometric means when the aircraft makes a turn, is gradually reduced.

Another feature of the invention resides in the provision of means for the control of the steering of the aircraft either by hand or at a distance, or instance by means of radio waves.

In the appended drawing which shows by way of example an arrangement according to the invention:

Fig. 1 is a diagrammatic view of said arrangement and Fig. 2 shows a modification of the manometric means.

In the drawing, 1 and 2 are Venturi nozzles which are disposed in a transverse plane of the aircraft, and for example, in the case of an aeroplane, the nozzles are disposed on either side and at the end of the wings, the axis of the said nozzles being horizontal. The Venturi nozzle 1 communicates with the conduit 3 and the nozzle 2 with the conduit 4; the end 5 of the conduit 3 is provided with a cock, or valve 7 and the end 6 of the conduit 4 with a like valve 8. The said valves which afford communication with the atmosphere may be controlled at the same time by hand by means of a handle 9 secured to a gear wheel 10 engaging two like wheels 11 and 12 which are keyed respectively to the barrels of the said cocks both of which, in the inoperative position, are closed or slightly open to the same degree.

The said device further comprises a U tube 13 of small cross section; the said tube contains mercury 14 and in each of its branches is disposed an insulated contact member 15, 16. In the position of rest the ends of said contact members are somewhat above the level of the mercury which is the same for both branches of the tube 13. At 17 is disposed an electric terminal which is in constant contact with the mercury 14, and has attached thereto a wire 18 which is connected to one pole of a source of current 19 whereof the other pole is connected on the one hand to the contact member 15 by the wire 20 and on the other hand to the contact member 16 by the wire 21. The coils 22 and 23 of two electro-magnets are respectively disposed upon the wires 20 and 21.

One branch of the tube 13 communicates with a U tube 24 of large cross section which is connected with the conduit 3; the other branch of the tube 13 communicates with a U-tube 25 analogous to the tube 24 and connected with the conduit 4. The tubes 24, 25 are filled with mercury 26, 27 to a level corresponding, in the position of rest to the level of the mercury 14 in the tube 13.

The glass recipient consisting of the combination of the tubes 13, 24 and 25 forms an aggregate which in reality, is of small size in order that the various levels of the mercury shall remain substantially unaffected by the variations in inclination of the aeroplane and by the effects of inertia and centrifugal force; for this purpose the two large tubes 24 and 25 are placed side by side in actual practice as if they were turned through 90° about the axis $y\ y'$ of the figure. At 27, 28, 29 and 30 are disposed suitable orifices which are closed by stoppers and are used for the filling of the tubes. Petrol preferably fills the spaces 31, 32 between the respective mercury levels in the tube 13 and in the tubes 24, 25.

The arrangement further comprises a compressed air servo-motor of a known type, this being diagrammatically represented in the figure; the said motor comprises two cylinders 33, 34 co-operating with the respective pistons 35, 36 which are connected to the respective ends of a rocking lever 37 movable upon the axis 38; said lever actuates the controlling cables for the rudder. Each cylinder is provided as usual with an exhaust valve 39, 40; the valve 39 is controlled by the electro-magnet 23 and the valve 40 by the electro-magnet 22.

Upon the lever 37 is mounted a slotted arm 41 cooperating with a stud 42 which is adjustably mounted upon the guide 43 secured to the shaft 44 upon which is also mounted a pinion 45 engaging the gear wheels 46, 47 respectively secured to the barrels of the two cocks 48, 49 controlling the atmospheric communication of two tubes 50, 51 respectively connected with the conduits 3, 4. In the position of rest both cocks are closed or very slightly opened to the same degree.

The operation is as follows:

With the aeroplane in normal flight in a straight line, the said device will be in the normal position or position of rest as herein represented, the level of the mercury being the same throughout.

If for any reason the aeroplane should turn to the right, the stabilizer will come into action to counteract this change in direction and to act upon the rudder controls in such manner as to maintain the aeroplane upon a straight path. When turning to the right, the outer wing of the turn will travel at a greater speed than the inner wing, so that the nozzle 1 upon the outer wing will set up in the conduit 3 a vacuum which is greater than the vacuum produced by the nozzle 2 in the conduit 4. The mercury will thus rise in the branch of the tube 24 which is connected with the conduit 3 and will descend in the branch of the tube 25 connected with the conduit 4. This difference of level will be small by reason of the large cross section of the said tubes, but it will be much greater in the tube 13; the mercury 14 enters into contact with the electric contact member 15, so that the coil 22 will receive current from the source 19; the valve 40 will open, and the rocking lever 37 will assume the inclined position as shown in the drawing, thereby acting upon the rudder of the aeroplane.

The arm 41 will act upon the guide 43, thus opening the cock 48 and closing the cock 49, thus diminishing the vacuum due to the nozzle 1 and augmenting the vacuum due to the nozzle 2; the mercury will now resume its initial position, the circuit is broken at 15, and the motion of the servo-motor is reduced and finally arrested.

As the aeroplane resumes its straight path, the vacuum due to the nozzle 2 will prevail over the one which is due to the nozzle 1, and the circuit will be closed at the contact member 16, thus restoring the rudder to its initial position in a gradual manner and leaving it in the straight position when the aeroplane has resumed its flight in a straight path. In virtue of the above described control arrangement, one will avoid the swaying which would take place in the flight of the aeroplane if the variations in the mercury level were used for the direct operation of the rudder of the aeroplane by means of a servo-motor which would not be subjected to a progressive control.

Should it then be desired to operate the said rudder in order to steer the aeroplane, the pilot acts upon the handle 9 which he turns in either direction in order to open one of the cocks 7 or 8 to a greater degree whilst the other cock will be thus closed. In these conditions, the vacuum in the conduits 3, 4 will be varied in such manner that the level of the mercury will vary in the tube 13 so that the proper contacts will be made which control—through the servo-motor—the rudder of the aeroplane. The turn which is made by the aeroplane will have a radius such that the difference between the vacuums due to the said turn will compensate for the difference between the vacuums produced by operating the cocks 7 and 8. Instead of being controlled by hand, the handle 9 may be controlled by a servo-motor, known per se, which is operated in any suitable manner, e. g. by means of radio waves.

It has been above stated that the level of the mercury is the same throughout the whole apparatus, but obviously the level in the tube 13 may be different from the level in the tubes 24 and 25. On the other hand, the mercury in the tubes 24 and 25 may be replaced by an insulating liquid of any suitable nature.

Moreover, for the manometric device constituted by the tubes 13, 24 and 25 may be substituted manometric boxes of any known type and capable of registering the pressure differential produced by the nozzles 1 and 2.

In the modification shown in Fig. 2 for the manometric means, the latter are constituted by two V shaped tubes 61 and 62, each of which has a branch of small cross section and a branch or large cross section, the branches of small cross section being preferably crossed as shown in the drawing; the ends of the branches of small cross section are upturned as shown at 63 and 64 and are connected to each other by the tube 65. The tubes 61 and 62 are filled with mercury while the tube 65 and the upper parts of the branches of small cross section are filled with petrol. The electrodes are disposed at 15 and 16, the terminal 17 of Fig. 1 being now replaced by two terminals 66 and 67 connected at 68.

The operation of this device is obviously analogous to that described with reference with Fig. 1 and offers this advantage that, for a given vacuum produced above the level of the mercury in one branch of large cross section, the displacement of the level of the mercury in the branches of small cross section increases with the angle $\alpha$.

Having now described my invention, what I claim as new and desire to secure by Letters Patent is:

1. In a stabilizer for aircraft comprising Venturi nozzles disposed on either side of the longitudinal middle plane of the aircraft, manometric means adapted to register the pressure differential produced by said nozzles, pipes respectively connecting said nozzle with said manometeric means, adjustable air inlet members disposed upon said pipe, a servo-motor controlled by said manometric means, and means for operatively connecting said servo-motor with the rudder of the aircraft, the provision of means for operatively connecting said servo-motor with said air inlet members whereby the action of the nozzle having the predominant action upon the manometric means is gradually reduced.

2. In a stabilizer as claimed in claim 1 the further feature residing in that the servo-motor is a compressed air servo-motor embodying air operated pistons supported by a common rocking lever, each air inlet member being provided with a pinion engaging a common toothed wheel operatively connected with said rocking lever.

3. In a stabilizer as claimed in claim 1 the further feature residing in the provision of additional air inlet members upon said pipes and separate means for operating said additional air inlet members independently of the action of said nozzles.

4. In a stabilizer as claimed in claim 1 the further feature residing in the provsion of additional air inlet members upon said pipes and separate means operated by the driver for operating said additional air inlet members independently of the action of said nozzles.

5. A stabilizer for aircraft comprising Venturi nozzles disposed on either side of the longitudinal middle plane of the aircraft, a mercury U-shaped tube of small cross section disposed in a transverse plane of the aircraft, two U-shaped tubes of enlarged cross section and containing a liquid and the branches whereof are respectively connected with one branch of the tube of small cross section and with said Venturi nozzles, a servo-motor, electric contact members carried by the tube of small cross section above the normal level of the mercury in both branches of said tube and adapted to control said servo-motor according to the variations in the level of the mercury and means for operatively connecting said servo-motor with the rudder of the aircraft.

6. A stabilizer for aircraft comprising Venturi nozzles disposed on either side of the longitudinal middle plane of the aircraft, two mercury V-shaped tubes disposed in the same transverse plane of the aircraft, each of said tubes having an inclined branch of small cross section and a branch of enlarged cross section, a pipe connecting the ends of the branches of small cross section and containing a liquid, the ends of the branches of larger cross section being respectively connected with said Venturi nozzles, a servo-motor, electric contact members carried by the branches of small cross section, above the normal level of the mercury in both branches and adapted to control said servo-motor according to the variations in the level of the mercury and means for operatively connecting said servo-motor with the rudder of the aircraft.

In testimony whereof I have signed my name to this specification.

MAURICE ALEXANDRE MAZADE.